(12) United States Patent
Lloyd

(10) Patent No.: US 8,481,832 B2
(45) Date of Patent: Jul. 9, 2013

(54) DOCKING STATION SYSTEM

(76) Inventor: Bruce Lloyd, St. Leonard, MD (US)

( * ) Notice: Subject to any disclaimer, the term of this patent is extended or adjusted under 35 U.S.C. 154(b) by 47 days.

(21) Appl. No.: 13/361,295

(22) Filed: Jan. 30, 2012

(65) Prior Publication Data

US 2012/0194994 A1    Aug. 2, 2012

Related U.S. Application Data

(60) Provisional application No. 61/437,563, filed on Jan. 28, 2011.

(51) Int. Cl.
*G10D 3/00*      (2006.01)

(52) U.S. Cl.
USPC ........................... 84/329; 361/679.41

(58) Field of Classification Search
USPC ........................ 84/329; 361/679.41
See application file for complete search history.

(56) References Cited

U.S. PATENT DOCUMENTS

| | | | | |
|---|---|---|---|---|
| 5,222,007 A * | 6/1993 | Suzuki et al. | ................. | 360/137 |
| 5,341,434 A * | 8/1994 | Kawamoto | ..................... | 381/86 |
| 5,537,673 A * | 7/1996 | Nagashima et al. | ........... | 455/346 |
| 5,575,544 A * | 11/1996 | Hasegawa et al. | ............. | 312/7.1 |
| 5,837,912 A | 11/1998 | Eagen | | |
| 5,974,333 A * | 10/1999 | Chen | .......................... | 455/569.2 |
| 6,163,326 A * | 12/2000 | Klein et al. | .................... | 345/156 |
| 6,166,722 A * | 12/2000 | Kawabe et al. | ................ | 345/169 |
| 6,407,467 B1 * | 6/2002 | Scheuer et al. | ............... | 307/10.1 |
| 6,489,932 B1 * | 12/2002 | Chitturi et al. | ................. | 345/30 |
| 6,650,026 B2 * | 11/2003 | Arai et al. | ...................... | 307/10.2 |
| 6,681,104 B1 * | 1/2004 | Scheuer et al. | ............... | 455/345 |
| 6,961,237 B2 * | 11/2005 | Dickie | ..................... | 361/679.04 |
| 7,054,965 B2 * | 5/2006 | Bell et al. | ......................... | 710/72 |
| 7,262,359 B1 | 8/2007 | Edwards, Sr. et al. | | |
| 7,524,197 B2 * | 4/2009 | Mills et al. | ..................... | 439/131 |
| 8,068,882 B2 * | 11/2011 | Davis et al. | ................ | 455/569.1 |
| 8,093,486 B2 | 1/2012 | Behringer et al. | | |
| 8,149,224 B1 * | 4/2012 | Kuo et al. | ...................... | 345/173 |
| 2004/0224638 A1 * | 11/2004 | Fadell et al. | ................. | 455/66.1 |
| 2005/0183566 A1 | 8/2005 | Nash | | |
| 2007/0234880 A1 | 10/2007 | Adams | | |
| 2008/0184864 A1 | 8/2008 | Holt | | |
| 2008/0270665 A1 * | 10/2008 | Senatori et al. | ............... | 710/303 |
| 2010/0246119 A1 * | 9/2010 | Collopy et al. | ........... | 361/679.55 |
| 2010/0251243 A1 * | 9/2010 | Gill et al. | ....................... | 718/100 |
| 2011/0248665 A1 * | 10/2011 | Smith et al. | .................... | 320/101 |
| 2012/0194994 A1 * | 8/2012 | Lloyd | ........................ | 361/679.41 |
| 2012/0264329 A1 * | 10/2012 | Hayashida et al. | ........... | 439/529 |
| 2012/0282858 A1 * | 11/2012 | Gill et al. | ...................... | 455/41.1 |

FOREIGN PATENT DOCUMENTS

| | | |
|---|---|---|
| JP | 2011100156 A | 1/2011 |
| WO | 2008110772 A1 | 9/2008 |

* cited by examiner

*Primary Examiner* — David Warren
*Assistant Examiner* — Robert W Horn
(74) *Attorney, Agent, or Firm* — The Law Firm of Andrea Hence Evans, LLC

(57) ABSTRACT

A portable docking station system is designed to mount a portable computing device flush onto a musical instrument. The system features buttons or openings so the user can easily access the controls on the computing device such as volume and power. The system features a housing having a eject system allowing the edge to pivot which provides ease in installing and removing an attached portable computing device. The system is adjustable to receive computing devices of various sizes and thicknesses. Fillers or spacers are added to the system to accommodate various computing devices.

16 Claims, 5 Drawing Sheets

FIG. 6 is a top view of the spacer.
FIG. 7 is a side view of the docking station system.

DOCKING STATION SYSTEM

RELATED APPLICATIONS

The present application is a continuation of prior U.S. patent application Ser. No. 61/437,563 filed on Jan. 28, 2011, the entirety of which is incorporated herein by reference.

FIELD OF THE INVENTION

The present invention relates in general to a detachable and adjustable docking station system which can attach and detach a portable computing device, such as a smart phone device, to a musical instrument.

BACKGROUND OF THE INVENTION

Smart phone apps now exist for use with musical instruments using built in pickups or microphones that convert sound vibrations into electrical signals. These apps allow the user to add effects, record, playback, listen to what is being played using ear phones, tune the instrument, share information and recordings using the internet or connect to external powered speakers. Example of such an app is Amplitube® made by IK Multimedia for electric guitars. In order for the user to connect the smart phone to the guitar additional external cables and an electronic interface, are needed. The user is also required to be able to access all the control buttons of the smart phone to operate these apps, to include the volume, touch screens, and power. Therefore the smart phone must be kept within reach to the user to control the apps. These connections and requirements restrict the freedom of the user to move around freely while playing the instrument and operating the smartphone.

SUMMARY OF THE INVENTION

This invention introduces a portable docking station system which supports a portable computing device such as a smart phone. The system allows easy attachment to an instrument, such as a guitar, and the system affords the user the ability to freely move while playing the instrument.

An aspect of an embodiment of the invention provides a docking station system mounted flush to minimize obstruction to playing the instrument.

A further aspect of an embodiment of the invention provides a docking station system which provides easy access to controls on the portable computing device.

A further aspect of an embodiment of the invention provides a docking station system adaptable to receive portable computing devices of various thicknesses.

Additional aspects, objectives, features and advantages of the present invention will become apparent from the following description of the preferred embodiments with reference to the attached drawings.

DETAILED DESCRIPTION OF THE INVENTION

Figure 1:
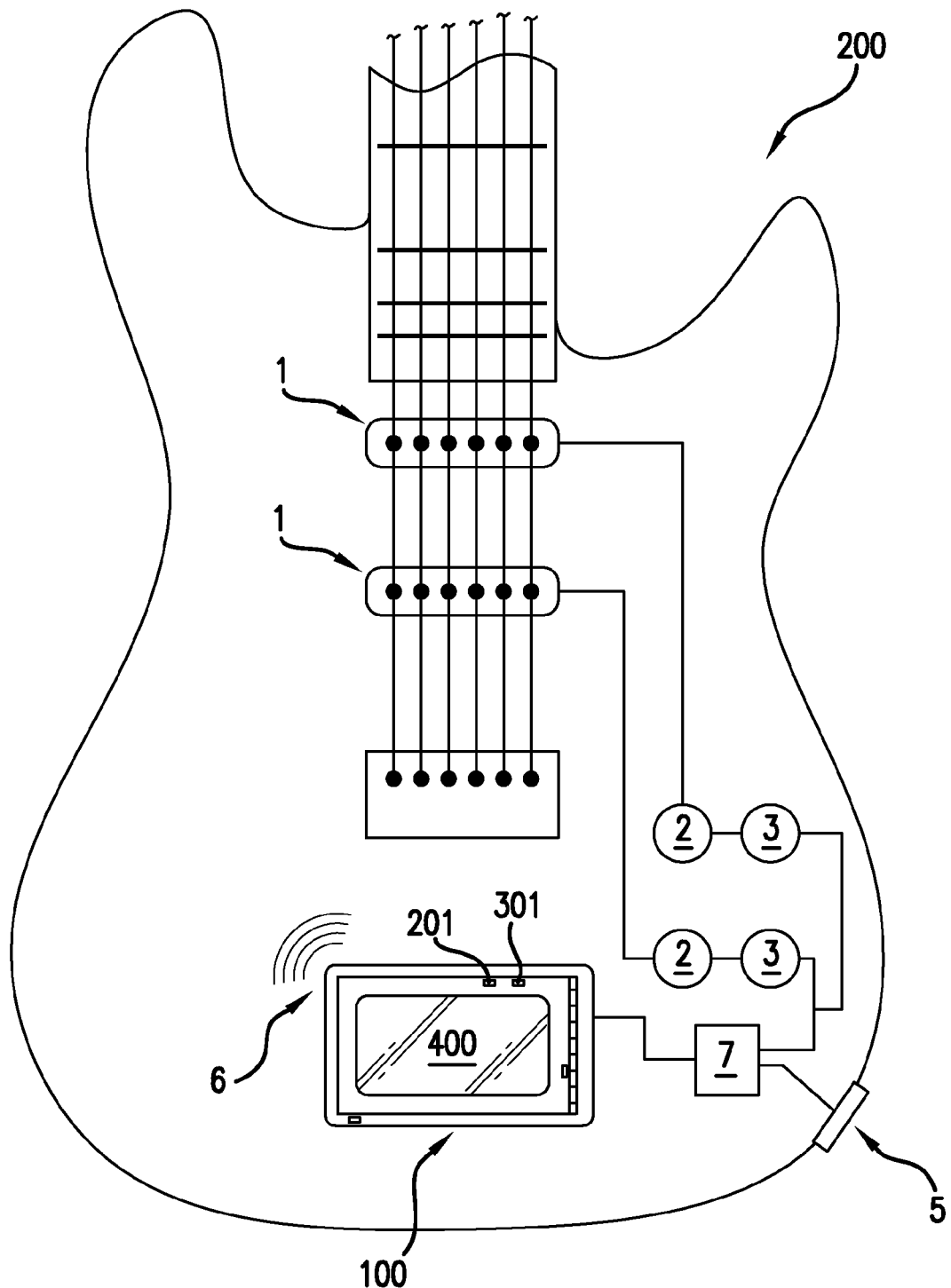
FIG. 1 is a perspective view of the docking station system of the present invention in an electric guitar.

FIG. 1 is a perspective view of the docking station system 100 of the present invention in an electric guitar 200. Pickup 1 is a transducer that captures sound vibrations from the guitar 200. The volume control 2 and tone control 3 control the volume and tone of the guitar, 200, respectively. The guitar 200 features a connection 5 for external devices such as ear phones or an amplifier, for example. The guitar also features a wireless connection system 6, which enables the guitar to connect to a Wi-fi, cell phone or blue tooth service. Built inside of the guitar 200 with the wires hidden in the casing of the guitar 200 is an adapter 7. The adapter 7 allows a user to access a large bank of amps, pedals and effects directly through a portable computing device, 400, such as a smartphone. The adapter 7 gets the instrument's signal into and out of the portable computing device, such as a smart phone device like an Iphone® or Ipod touch®. The adapter may be an IRig® device or a comparable adapter currently available on the market. In the present invention, it is preferred that the adapter 7 be embedded in the guitar 200 such that the wires are hidden. The adapter 7 may also be embedded in the docking station itself A wire is connected to the volume control 2 and tone control 3, the computing device 400 and to the connection 5 for external devices. Once the user connects the computing device in the docking station system of the present invention to the adapter 7, the user can move around with the guitar freely without the worries of any external loose wires. The casing of the guitar 200 covers the wires of the connected devices.

Figure 2:
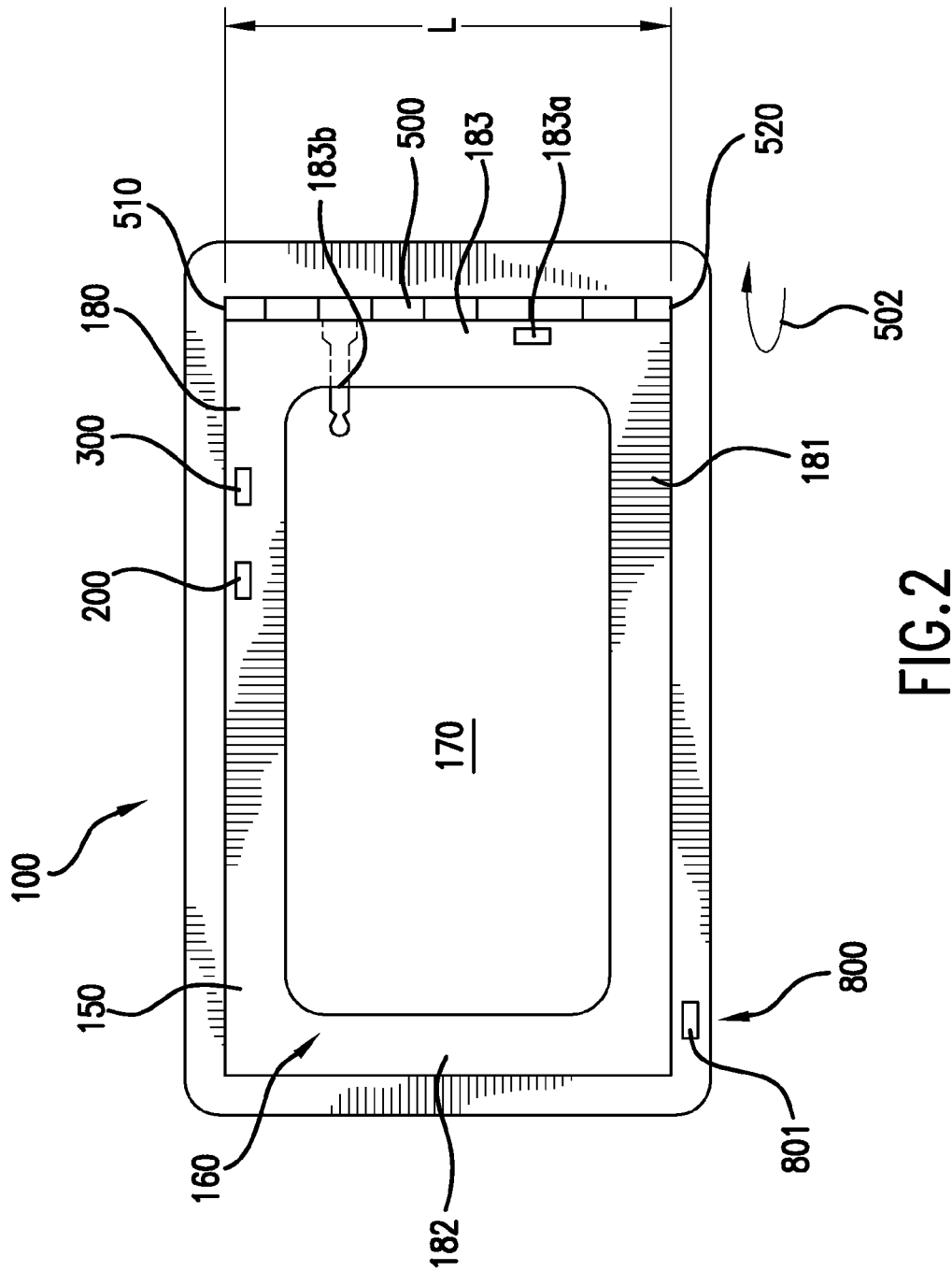
FIG. 2 is a top view of the docking station system of the present invention.

FIG. 2 is a top view of the docking station system 100 of the present invention. The docking station system 100 is capable of receiving a portable computing device 400, shown in FIG. 1. The docking station system features a housing 150 having a top side 160 with a cut-out opening 170 about the size of the portable computing device. The cut-out opening 170 allows the user easy access to the touch screen and buttons on the front of the computing device 400. The opening 170 is supported and surrounded by a top edge 180, bottom edge 181 and left 182 and right edge 183 of the housing 150. The edges 180, 181, 182 and 183 act as the border of the opening 170. The top edge 180 has control buttons 200, 300 that aligns with the portable computing device's 400 control buttons 201, 301 when the device is in the housing 150. Typically, when the device 400 is an Iphone®, the control buttons 201 and 301 are the volume control of the device. Button 201 decreases the volume of the phone and 301 increase the volume. Control buttons 200, 300 may be rocker switches. The switches 200, 300 are positioned such that the phone 400 is secure in the docking station system 100, the user can still access the control buttons on the device 400 without having to remove the device 400.

The user can simply rock the switch 200 over button 201 to decrease the volume and switch 300 over control 301 to increase the volume, for example. Alternatively, rather than having control buttons on the top edge, the top edge 180 features top edge cut-outs that are aligned with the portable computing device's control buttons when the device is in the housing. The top edge cut-outs will afford the user the ability to use a digit or an extension of their digit to control the buttons 201, 301 without having to remove the device unnecessarily once positioned in the docking station 100. The right edge 183 of the top side 160 features a right edge cut-out or a button 183a that is aligned with the power control for the computing device. The user can either use its digit or an extension of its digit to power the device or the button to control the device's power. The right edge 183 also features an opening 183*b* that receives the adapter 7. The opening 183*b* is sized to receive the cord of the adapter 7 and it is aligned with the opening of the device 400, which receives the cord. The area 500 on a musical instrument is sized to receive the docking system station. Alternatively, the docking station can be attached to a panel and then the panel secured to the guitar. The bottom side 300 of the housing 150 is symmetrical to the top side 160. The bottom side has bottom side edges that are aligned with the top side edges and the edges connect to fit the width of the portable computing device.

Figure 3:
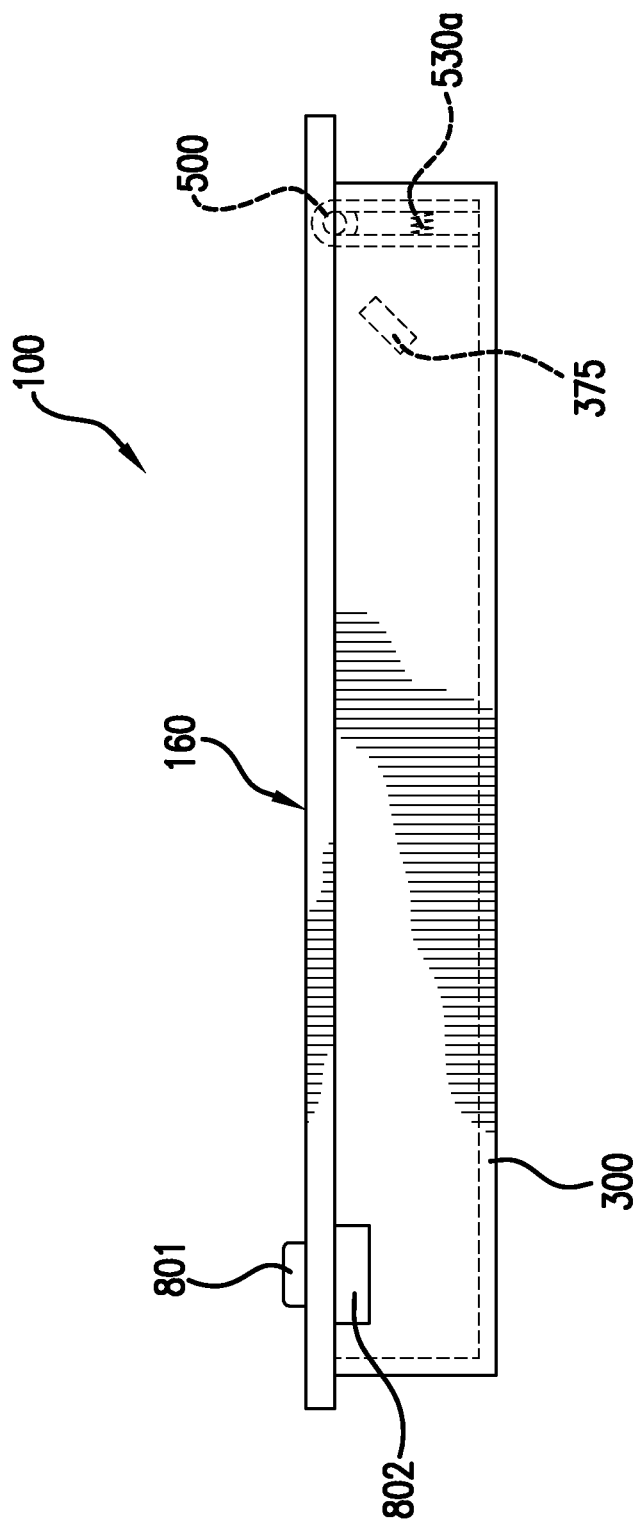
FIG. 3 is side view of the docking station system of the present invention.
Figure 7:
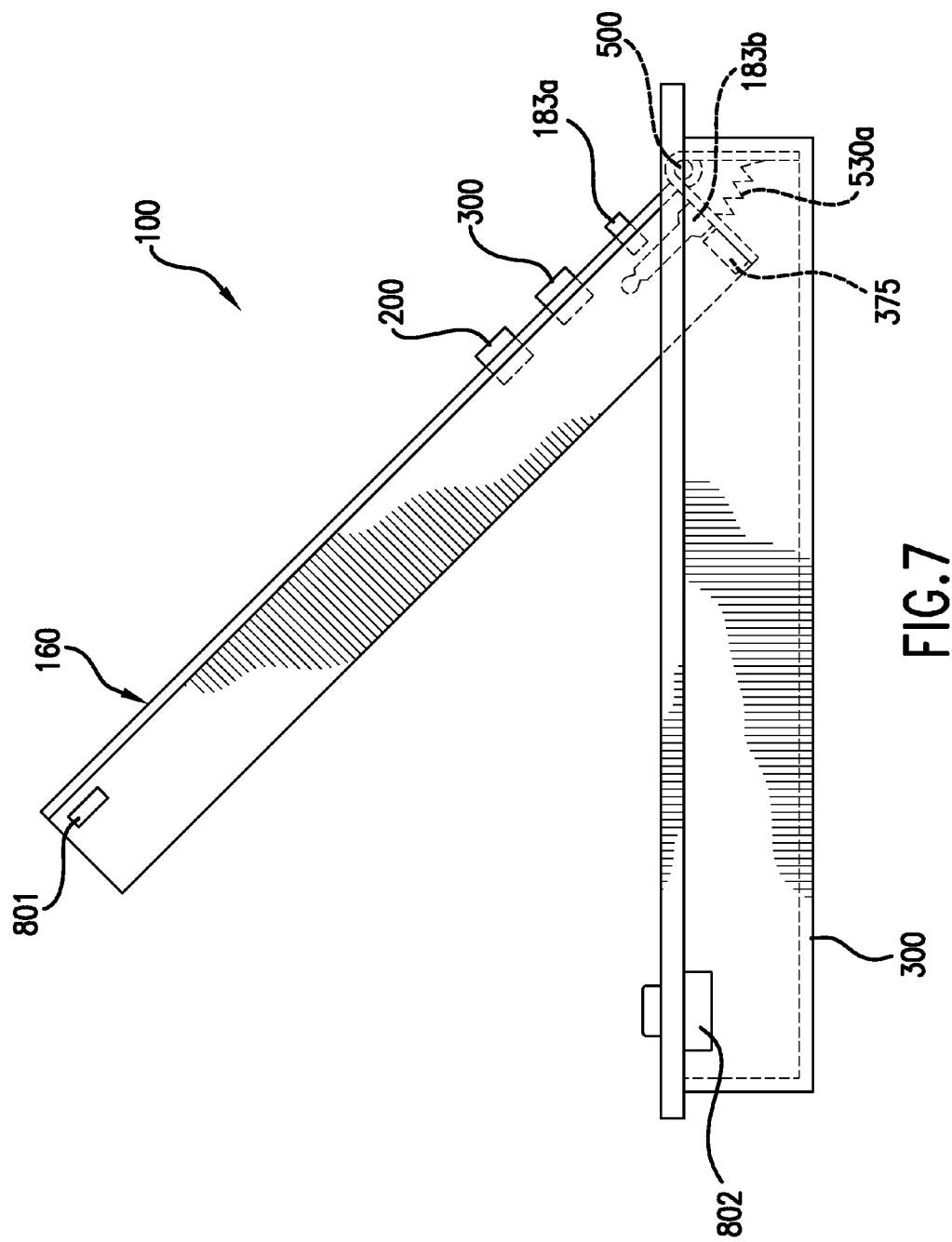

The docking station system also features an ejection system 800 having a pivoting mechanism that allows the top side 160 to pivot on the right edge 183, shown in FIG. 7. FIG. 7 is a side view of the docking station system. Alternatively, the ejection system 800 can be configured to allow the top side 160 to pivot on the left edge 182 to open the housing to receive the portable computing device. FIG. 3 is side view of the docking station system of the present invention. On the top side 160, bottom edge 181, features an ejection button 801 on the top side of the housing which releases the top side 160 from the bottom side 300 of the housing 150. In a closed position, shown in FIG. 3, the eject button 801 contacts a catch 802, which locks the top side of the housing in a down and closed position.

Figure 4:
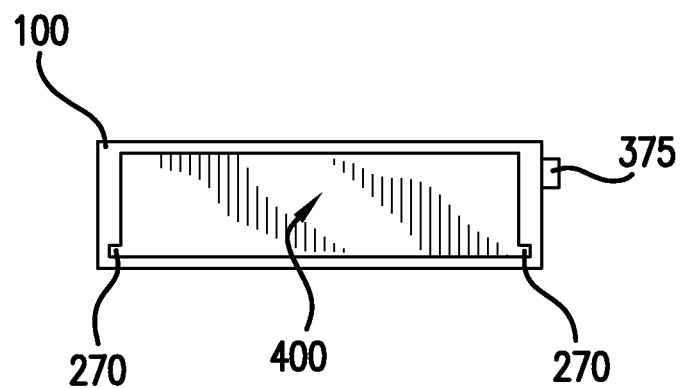
FIG. 4 is a perspective view of the cut-out opening illustrating slots which receive spacers.
Figure 5:
FIG. 5 is an end view of a spacer.
Figure 6:
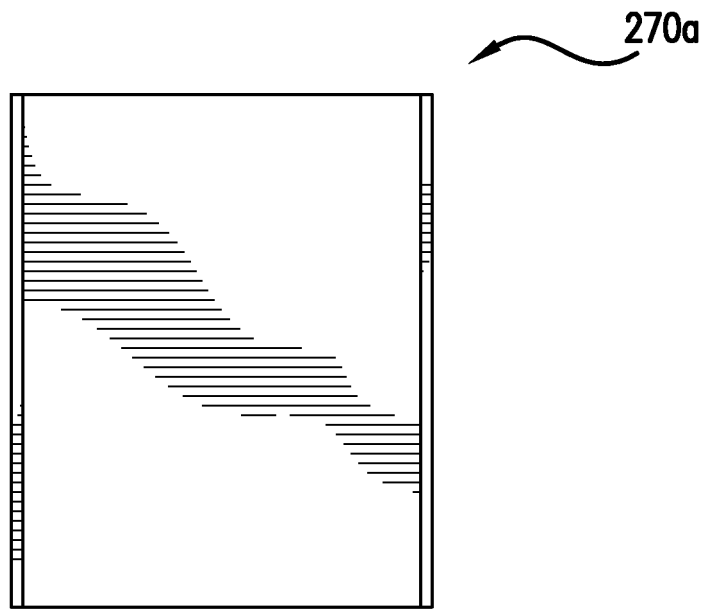

When 801 is pushed, to release the catch 802, the top side of the housing is moved to an open position, as shown in FIG. 7. The ejection system 800 also features a pivot member 500, shown in FIG. 2, pivoted about an axis which runs along the length L of the top side edge in a clockwise direction of the arrow 502 shown in FIG. 2. to open the top side. When the top lid is closed, or pushed in a downward direction, the pivot member is rotated in a counterclockwise direction. The pivot member may be a spring loaded hinge, for example. The pivot member 500 has a left end 510 and a right end 520 and spans at least the length of the right edge 183. The member 500 is connected to the right edge and an edge of the bottom side, as shown in FIG. 3. A spring 530*a* span a length between the edge on the top to the bottom of the housing. The spring 530 is in a compressed position when the top side is closed and decompressed when the top side is open. The spring 530*a* exerts a force when decompressed to rotate the pivot member in direction 502 to facilitate in lifting the top side of the housing. Although one spring is discussed, alternatively, multiple springs may be positioned along the underside of the pivot member to add in the rotation. A stopper 375 is positioned in the area between the top side and bottom side of the housing. When the top side is opened, as shown in FIG. 7, the stopper 375, is positioned to prevent the top side from extending past the stopper 375, whereby the top side is opened at about a 45 degree angle. FIG. 4 is a perspective view of the cut-out opening 170 illustrating parallel slots 270 which receive spacers. The slots 270 extend through the housing and act as rails around the device 400. The slots 270 extend at least the length of the device and may be larger than the device. The slots receive spacers 270*a* of various thicknesses to adjust the size of the cut-out to receive various sized computing devices. FIG. 5 is an end view of a spacer 270*a*. The spacers 270*a* are positioned in the slots 270 to accommodate thickness of devices. FIG. 6 is a top view of the spacer 270*a*. For example, a thin spacer would be used in the housing for the system to receive a thicker device. A thicker spacer would be used in the housing to receive a thinner device, depending on the spacing needed along the edges to secure a device. Alternatively, a spring plate may be used to hold the device in the system. Or, the system can be designed with interchangeable bodies sized to receive devices of numerous shapes and sizes.

The docking station system may be connected and mounted flush to a musical instrument having an open area on the musical instrument designed to receive the docking station system and connected portable computing device. Or, the system can be mounted or secured to a plate and then attached to a musical instrument.

The invention has been described in detail with particular reference to certain preferred embodiments thereof, but it will be understood that variations and modifications can be effected within the spirit and scope of the invention.

The invention claimed is:

1. A docking station system capable of receiving a portable computing device comprising:
   a housing having a top side with a cut-out opening about the size of the portable computing device,
   wherein the opening is supported by a top edge, bottom edge and left and right edge of the housing;
   wherein the top edge has at least one control button that aligns with the portable computing device's control button when the device is in the housing;
   a bottom side which is symmetrical to the top side, wherein the bottom side has bottom side edges that are aligned with the top side edges;
   and an ejection system having a pivoting mechanism that allows the top side to pivot on the right or left edge to open the housing to receive the portable computing device.

2. The docking station system of claim 1, wherein the ejection system further comprises an ejection button on the top side of the housing which releases the top side from the bottom side of the housing.

3. The docking station system of claim 1, wherein the ejection system features a pivot member pivoted about an axis which runs along the length of the top side edge.

4. The docking station system of claim 3, wherein the pivot member has a left end and a right end which are aligned with a left spring and a right spring whereby the left and right springs exert a force when decompressed to rotate the pivot member to facilitate in lifting the top side of the housing.

5. The docking station system of claim 1, wherein the cut-out features parallel slots that extend through the housing, wherein the slots receive spacers of various thickness to adjust the size of the cut-out to receive various sized computing devices.

6. The docking station system of claim 1, wherein the housing is connected to a musical instrument.

7. A docking station system capable of receiving a portable computing device comprising:
   a housing having a top side with a top side cut-out opening about the size of the portable computing device,
   wherein the opening is supported by a top edge, bottom edge and left and right edge of the housing;
   wherein the top edge has a top edge cut-out which aligns with at least one of the portable computing device's control buttons when the device is in the housing;
   a bottom side which is symmetrical to the top side, wherein the bottom side has bottom side edges that are aligned with the top side edges;
   and an ejection system having a pivoting mechanism that allows the top side to pivot on its right or left edge to open the housing to receive the portable computing device.

8. The docking station system of claim 7, wherein the ejection system further comprises an ejection button on the top side of the housing which releases the top side from the bottom side of the housing.

9. The docking station system of claim 7, wherein the ejection system features a pivot member pivoted about an axis which runs along the length of the top side edge.

10. The docking station system of claim 9, wherein the pivot member has a left end and a right end which are aligned with a left spring and a right spring whereby the left and right springs exert a force when decompressed to rotate the pivot member to facilitate in lifting the top side of the housing.

11. The docking station system of claim 7, wherein the top side cut-out features parallel slots that extend through the housing, wherein the slots receive spacers of various thickness to adjust the size of the top side cut-out to receive various sized computing devices.

12. The docking station system of claim 7, wherein the housing is connected to a musical instrument.

13. A method of connecting a portable computing device to a musical instrument comprising:
    providing a docking station system having a housing with a top side;
    providing a cut-out opening on the top side, wherein the cut-out opening provides access to the portable computing device;
    wherein the cut-out opening is supported by a top edge, bottom edge and left and right edge of the housing;
    providing a bottom side of the housing that is symmetrical to the top side, wherein the bottom side has bottom side edges that are aligned with the top side edges;
    providing an ejection system which allows the top side to pivot on the right or left edge to open the housing to receive the portable computing device; and
    inserting the portable computing device in the docking station system
    providing a control button access feature on docking station systems adjacent to at least one control button on the right edge of the portable computing device; and
    activating the said control button on the right edge of the portable computing device that is reachable by the control button access feature.

14. The method of claim 13, wherein the ejection system further comprises a pivot member pivoted about an axis which runs along a length of the top side edge.

15. The method of claim 13 further comprising providing parallel slots in the cut-out opening on the top side that extend through the housing, wherein the slots receive spacers of various thickness to adjust the size of the top side cut-out to receive various sized computing devices.

16. The method of claim 13, further comprising a musical instrument having an area on the musical instrument that receives the docking station system and connected portable computing device.

\* \* \* \* \*